Nov. 4, 1924. 1,514,094
W. NOBLE
MACHINE FOR FURNISHING FRUIT JUICE BEVERAGES
Filed April 4 1921 7 Sheets-Sheet 2
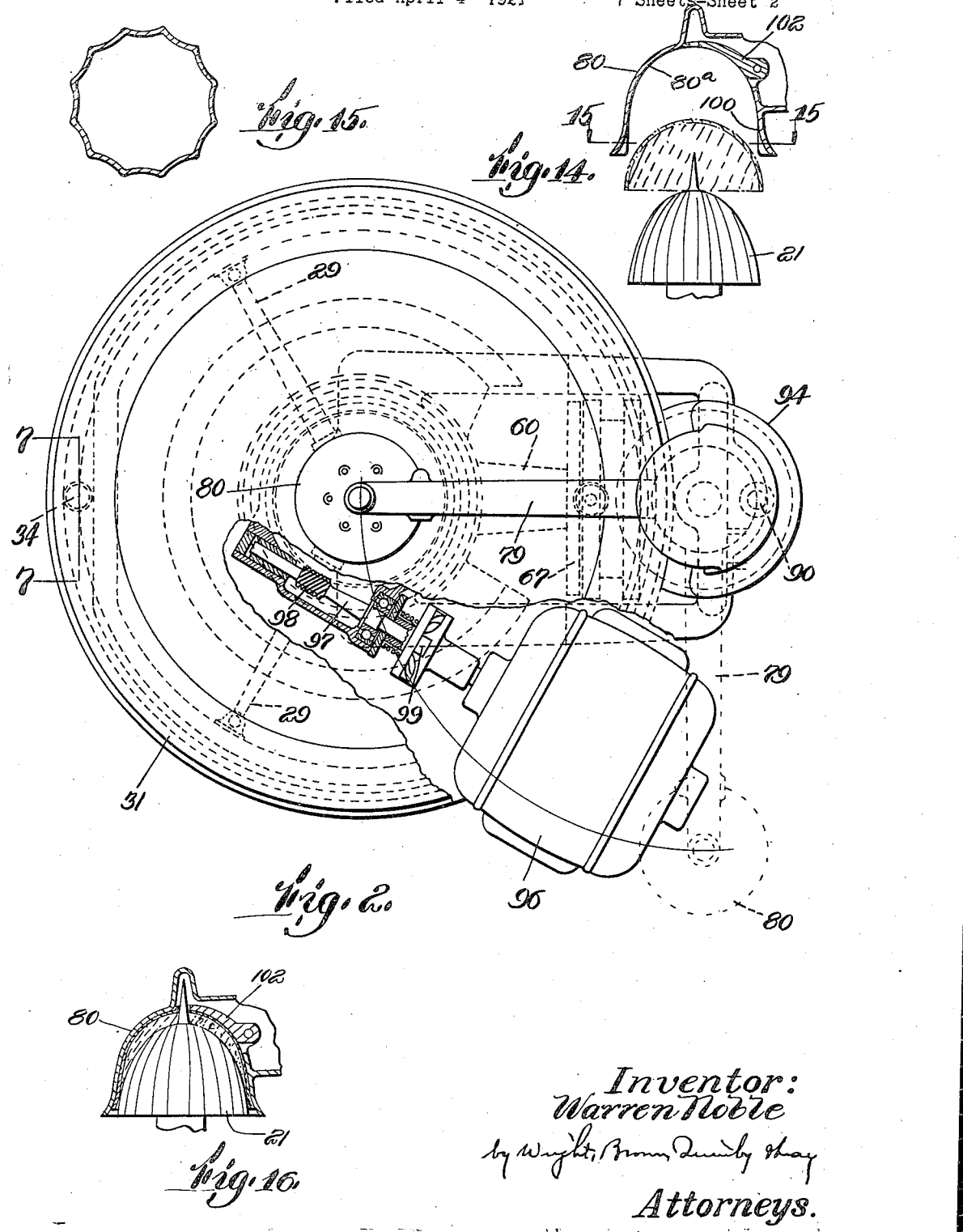
Inventor:
Warren Noble
by Wright, Brown, Quinby & Stay
Attorneys.

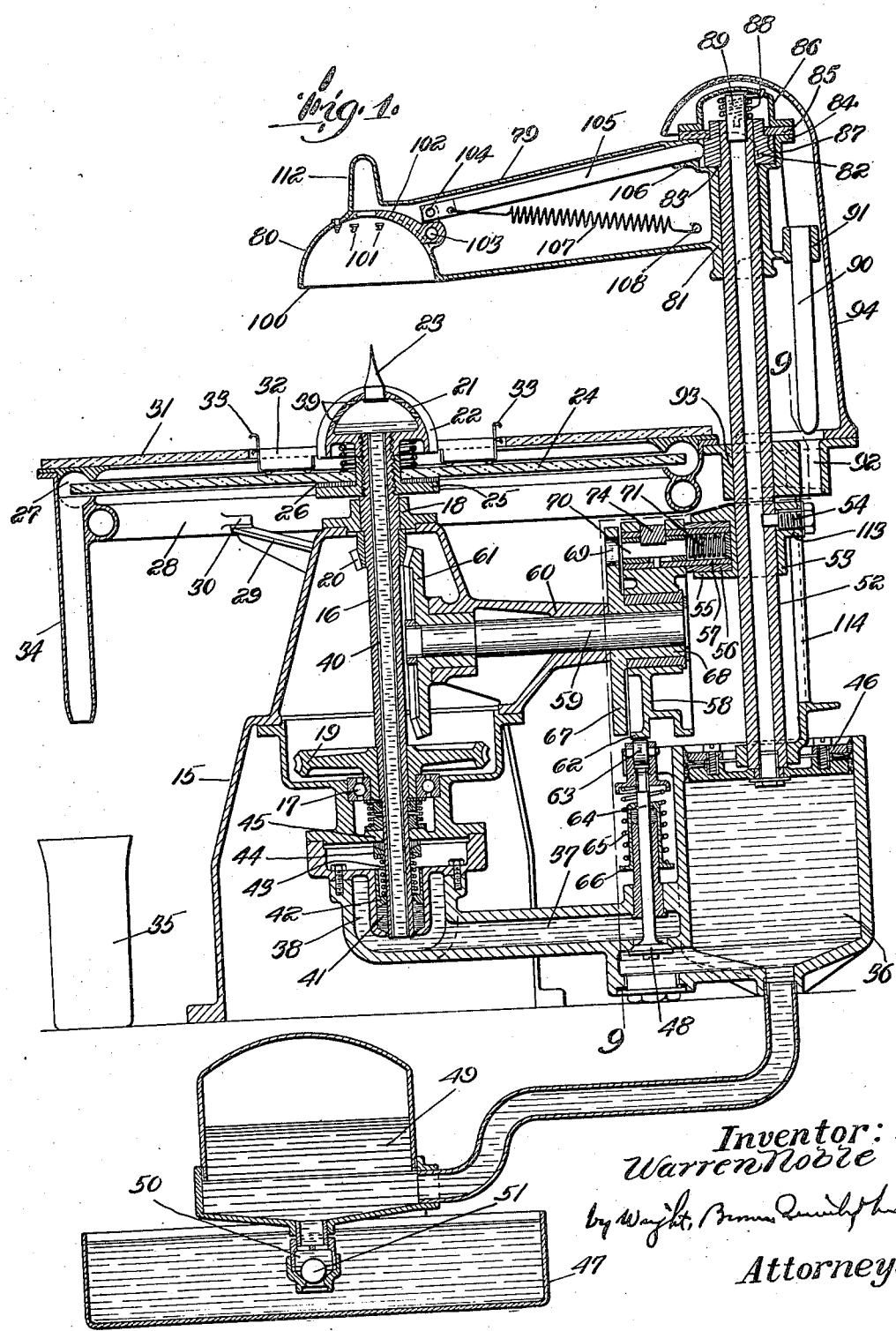

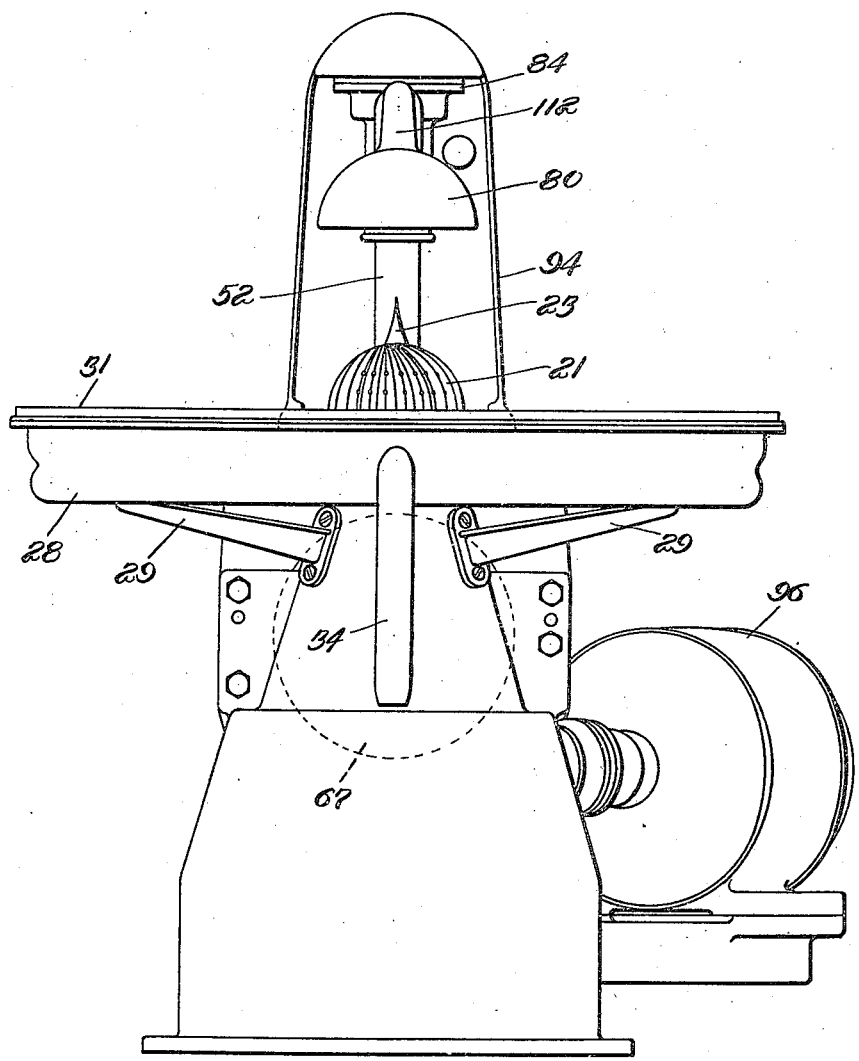

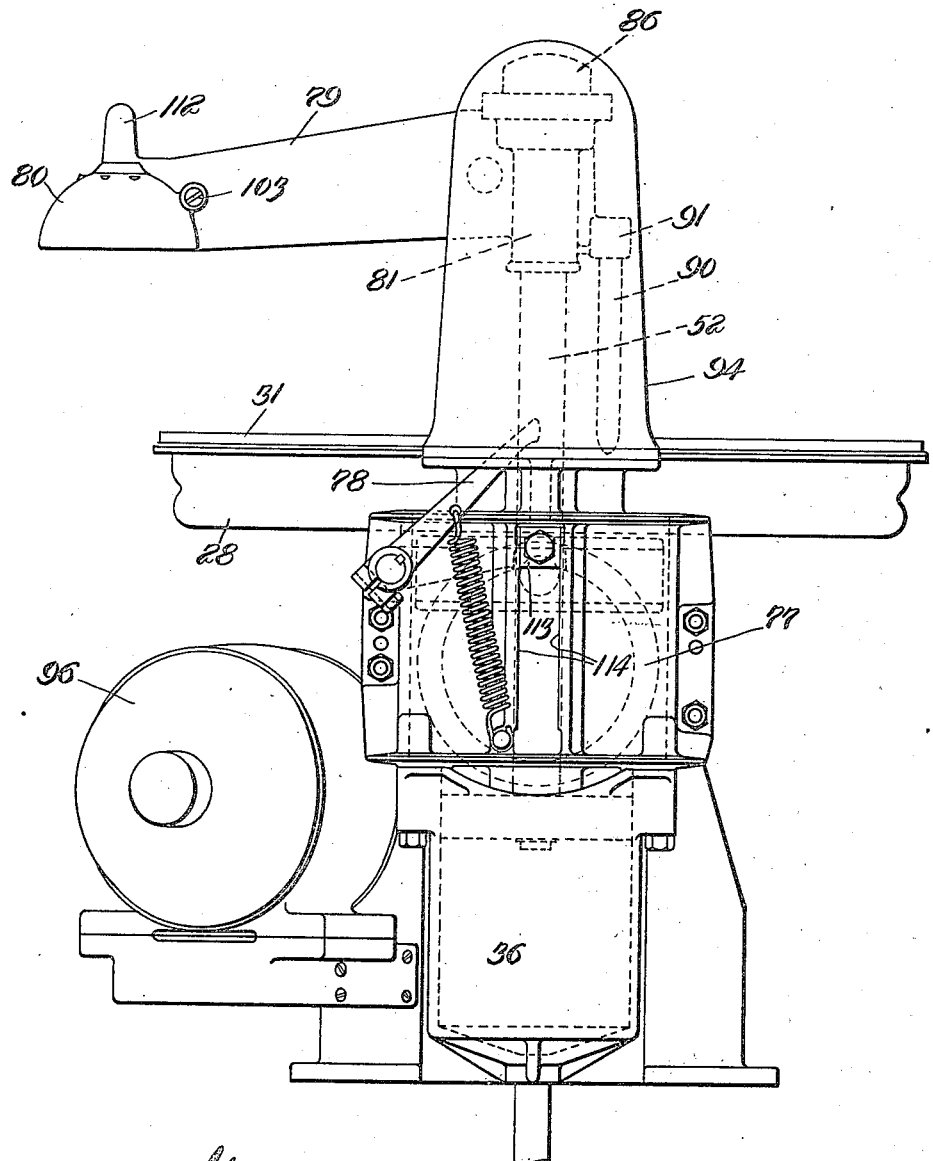

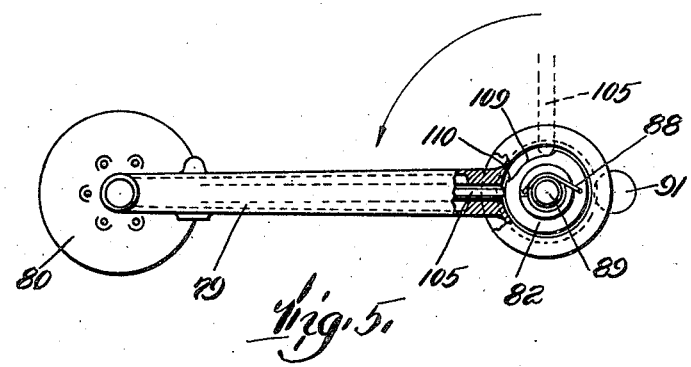
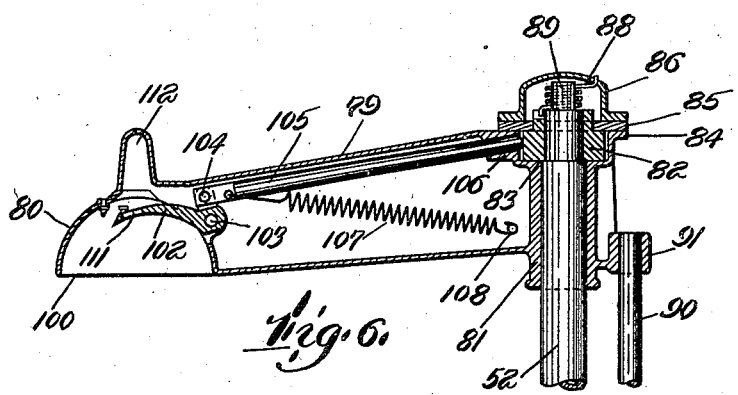
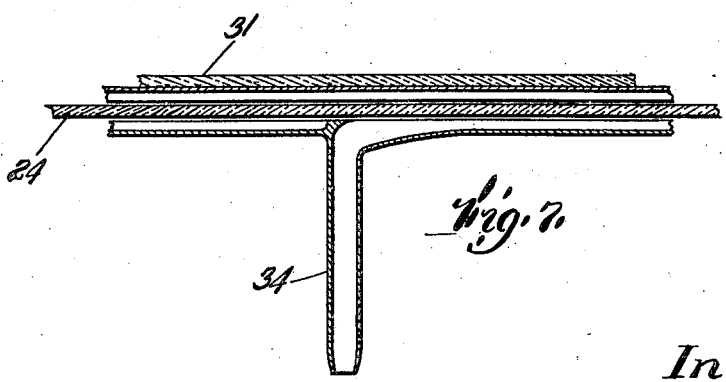

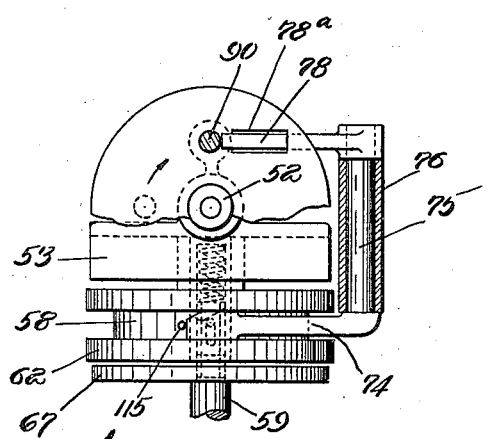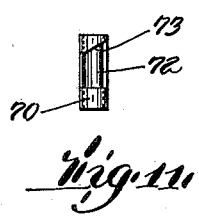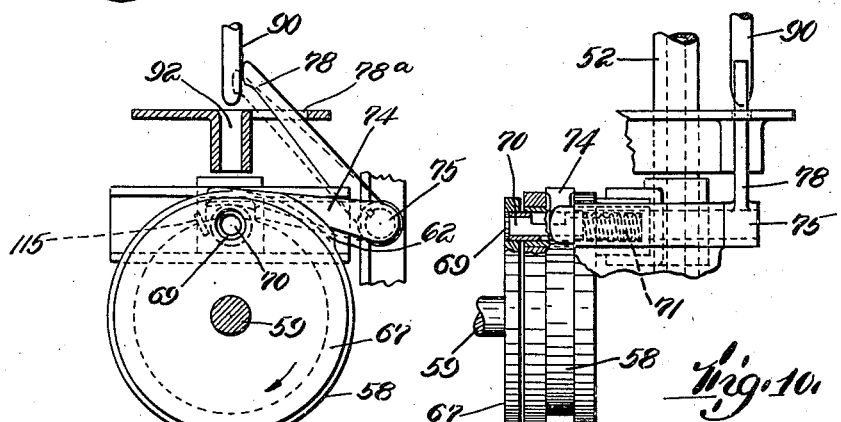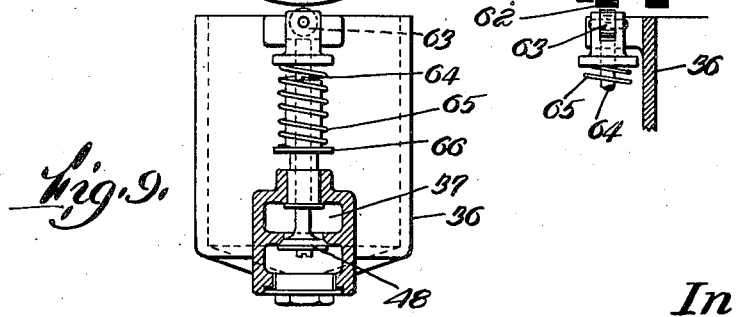

Nov. 4, 1924.
W. NOBLE
1,514,094
MACHINE FOR FURNISHING FRUIT JUICE BEVERAGES
Filed April 4, 1921
7 Sheets-Sheet 7
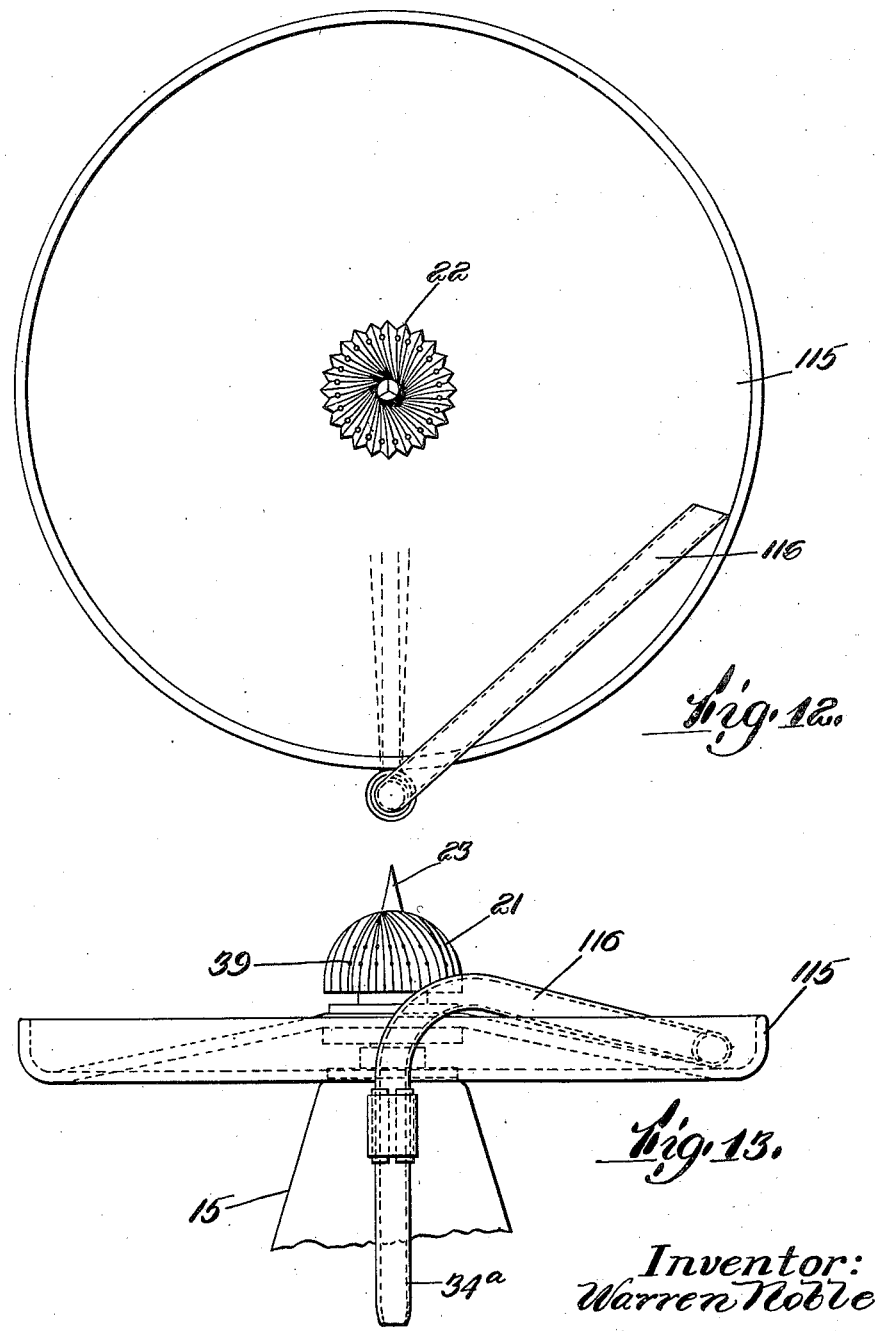
Inventor:
Warren Noble
by Wright, Brown Quinby Many
Attorneys.

Patented Nov. 4, 1924.

1,514,094

UNITED STATES PATENT OFFICE.

WARREN NOBLE, OF PROVIDENCE, RHODE ISLAND.

MACHINE FOR FURNISHING FRUIT-JUICE BEVERAGES.

Application filed April 4, 1921. Serial No. 458,290.

*To all whom it may concern:*

Be it known that I, WARREN NOBLE, a subject of the King of Great Britain, residing at Providence, in the county of Providence and State of Rhode Island, have invented new and useful Improvements in Machines for Furnishing Fruit-Juice Beverages, of which the following is a specification.

The specific object which I have had in view producing the machine hereinafter described has been to provide for counter use a machine capable of extracting the juice from an orange, and delivering the juice with or without an admixture of syrup into a glass or cup ready at hand for the consumer. The machine which I have produced for this purpose and which I will presently describe in detail with reference to the drawings forming a part of this specification comprises, generally, a rotating tool which is adapted to enter the fruit, a holder adapted to engage the outside of the fruit and hold it against the tool, means for mixing with the juice of the fruit thereby extracted another liquid, and means for delivering the mixture of fruit juice and the other liquid to a cup or glass.

Although the invention which I claim is embodied in such machine, it is not limited to all the details or functions of the machine or to the precise form, arrangement and combination of the several parts thereof, nor is it limited to the particular use of extracting the juice of oranges. It is obviously adapted, without change other than of specific sizes of its extracting tool and holder, for extracting the juice from other fruits as well, notably other citrus fruits, such as lemons and grape fruit, which have thick skins and a juicy pulp; and indeed of so treating any fruit which is capable of being operated on by tools of the sort with which this machine is equipped. Hence those parts of the following explanation of the structure and mode of operation of the specific machine here referred to which are given in terms of its use for extracting the juice from oranges are to be construed in the light of the broader statement last above given.

In the drawings:—

Figure 1 is a vertical central section of the machine in condition preparatory for operation upon an orange.

Figure 2 is a plan view of the machine in the same condition, with a part of its upper works broken away to show the driving mechanism.

Figure 3 is a front elevation of the machine.

Figure 4 is a rear elevation showing the holder turned aside in its normal and inoperative position.

Figure 5 is a plan of the fruit holder or presser and its carying arm, partly broken away to show a detail of operating mechanism.

Figure 6 is a longitudinal section of the parts shown in Figure 5.

Figure 7 is a detail sectional view of a part of the delivery means taken on line 7—7 of Figure 2.

Figure 8 is a plan view of a part of the driving mechanism and control therefor with parts broken away.

Figure 9 represents the same mechanism, being in part an elevation and in part a section on line 9—9 of Figure 1.

Figure 10 is an elevation of the same mechanism as seen from the right of Figure 9 partly broken away.

Figure 11 is a detail plan view of a coupling bolt which forms a part of the mechanism last referred to.

Figure 12 is a plan view and Figure 13 an elevation of a modified form of delivery table which may be used in a machine otherwise the same as that shown in the preceding figures.

Figure 14 is a detail view of the extracting couple as designed to extract essential oil from the skin of citrus fruits, as well as the juice from the pulp.

Figure 15 is a cross section of the fruit-holding cup taken on line 15—15 of Figure 14.

Figure 16 shows the extracting couple at the end of their action in squeezing an orange.

Like reference characters refer to like parts in all the figures of the drawings wherever they occur.

Referring particularly to Figure 1 for a general survey of the entire machine, 15 represents a base which may be set on the counter or on a bench or other support where beverages are purveyed to consumers. The base supports an upright rotatable hollow shaft or tube 16 which turns in suitable bearings 17 and 18 and to which are secured a driven worm gear 19, by which the shaft is rotated, and a bevel gear 20, by which the shaft is adapted to operate the holder or presser for the fruit, and a pump.

On the upper end of shaft 16 is a tool 21 which is of approximately hemispherical shape and is formed externally with blunt-edged V-shaped ribs 22 which preferably have a spiral arrangement, as shown in Figure 12. The primary function of this tool is to extract the juice from the half of an orange in cooperation with the external presser, later described, by excavating the pulp from within the skin. For convenience of description and because of its superficial similarity to routing tools used in the mechanical arts, I will in this specification call it a routing tool. These descriptive terms "routing" and "excavating," are used in this specification as the single words which most nearly indicate the characteristics of the tool and of its action, although their common definitions do not exactly fit the present case and special definitions are necessary for the purpose. The action of the tool on an orange is not strictly a cutting action but is rather one of crushing the pulp and breaking down the juice cells, squeezing and scraping the pulp from the skin and interior partition membranes of the orange, and extruding the juice. It is found on examination of the orange skins after this action has taken place that the pulp is almost wholly removed, but the lining and partition membranes are uncut. Hence for the purposes of this specification "excavating" means substantially the action just described, and a "routing tool" is a tool by which the action may be performed; although in respect to the action upon other than citrus fruits of machines containing this invention, the effect of cutting is not necessarily excluded, and the common definition of the terms referred to may apply. On the top of said routing tool and in the line of its axis is a pointed spike 23 provided to impale the half orange and hold it until the presser is brought to bear on the outside of the orange.

A turn table or disk 24 is mounted on the hollow shaft 16 and rests on the flanged collar 25 which is threaded upon the shaft, being pressed against the flange of said collar by a spring reacting on the routing tool, which likewise is threaded upon the shaft. Preferably this disk is of glass in order that it may be easily kept clean and also to give an attractive appearance, and a cushioning washer 26 is interposed between the glass disk and the clamping means for the purpose of firmly coupling the disk to the shaft without liability of breaking the glass. But the disk may be otherwise secured, as by cementing, to the flange. An annular conduit 27 surrounds the disk and is slotted in its inner circumference to admit the rim of the disk. Associated with this conduit is a pipe or coil 28 adapted to receive a cooling medium, such as chilled brine. The two conduits may be made as one casting, or otherwise associated in heat-conducting relationship, and may be supported in any suitable way at the proper height, the combined structure being here shown as mounted on arms 29 which project from the upper part of the base and on which lugs 30 of the tube or coil structure rest.

On the structure containing the annular conduit 27 is placed a cover plate 31 which is preferably of glass in order to expose to view the underlying turn table and show the operation of extraction and delivery of the fruit juice. This cover has an opening in its center surrounding the routing tool, through which the juice removed from the orange may flow and in which there is placed a strainer 32 for holding back seeds and other solid particles which would be objectionable if found in the drink served to the consumer. This strainer may be made of perforated sheet metal or of wire mesh fabric or in any other way in which strainers for various purposes are commonly made, and it has handle projections 33 by which it may be lifted when there is need of dumping its contents and washing it. In form the strainer is annular and has an interior opening which rather closely surrounds the routing tool. It rests on the turn table 24 and is rotated with the latter.

It will be understood that when the routing tool and disk are in rotation and the half of an orange is placed over the tool and pressed down upon it, the juice then expressed from the skin of the orange falls and is driven by centrifugal force into and through the outer wall of the strainer and then over the surface of the disk and into the surrounding conduit 27. The tangential component of motion given to the liquid by the rapidly rotating disk, and the whirling air current induced by the same means, cause the liquid to flow through the conduit until it reaches an outlet, from which a delivery tube or spout 34 extends downwardly in position to guide the juice into a glass or cup 35 placed beneath it on the counter. The disk may be considered for the purposes of this description as a carrier for the juice.

My invention contemplates, in addition to that of extracting and delivering juice from fruit, the further function of mixing another liquid with the juice (such as a syrup for sweetening) and delivering the mixture of fruit juice and the modifying liquid at the same time, when such mixture is desired. The added liquid is mixed with the fruit juice at the instant of extraction of the latter, being forced from a pump chamber 36 through a conduit 37 to a chamber 38 into which the tubular shaft 16 projects and thence through the tubular shaft into the interior of the routing tool 21, which is hollow, and through holes 39 in said tool between the flutes or vanes thereof.

A lining 40 of material which is not affected by the liquid is provided within the hollow shaft, and the lower end of said shaft is contained in a stuffing box 41 which contains a packing pressed upon by a gland 42 under pressure of a spring 43 for the double purpose of preventing escape of the liquid and of preventing infiltration of oil from the bearings of the shaft into the liquid. The spring 43 reacts against a collar 44 which confines a body of packing material against a wall 45 of the structure which holds the ball bearing 17.

A piston 46 works in the pump chamber to draw liquid thereinto from a supply tank 47, and to expel the liquid into the conduit 37 when a valve 48 interposed in said conduit, and preferably arranged to open against the pressure imposed on the liquid by the pump, is open, or into a pressure chamber 49 when said valve is closed, or otherwise so placed that the full delivery of the pump cannot pass it. The pressure chamber has a suction conduit 50 controlled by a check valve 51 and arranged to receive liquid from the tank 47, and the upper part of the chamber contains an entrapped body of air which is put under pressure by the displaced liquid under the expelling stroke of the piston.

A piston rod 52 rises from the piston 46 and carries a cross head 53 which is made fast to it by a screw 54. This cross head has a horizontal guideway 55 in which is a roller 56 carried by a crank pin 57 on a disk 58 which is loosely mounted on a shaft 59. This shaft rotates in a bearing 60 at the side of the base and carries a gear 61 which meshes with the driving pinion 20, previously described. Disk 58 is a combined crank and cam disk, and it has a cam zone 62 arranged to travel past a trundle roll 63 mounted in a holder which is secured to the end of a valve rod 64, said rod being the stem of the valve 48, previously described. A spring 65 bears on a sleeve 66, which surrounds the guide tube of the valve rod and is also the gland of a stuffing box for the rod, and it reacts against the holder of the trundle roll, normally holding the valve 48 seated and the trundle roll in close proximity to the low part of cam 62, but preferably out of actual contact therewith to ensure that the valve will be tightly seated.

A disk 67 is keyed or otherwise secured to shaft 59 beside the crank disk 58 and a sleeve or hub 68 on the disk 67 provides the bearing whereon the crank disk rotates. Disk 67 is formed with a hole or recess 69 adapted to receive a coupling pin 70 which is seated in the crank-pin 56, and is adapted to be moved endwise into the hole 69 by the pressure of a spring 71 confined in the crank-pin, when it is released and when the hole is in register with it.

Reference is directed to Figures 8 to 11 inclusive for details of the mechanism now being described. In the upper side of the coupling pin is a notch or recess 72 having an inclined bounding edge 73 toward the end which is more remote from the driving disk 67. This recess is normally occupied by a latch or holder which is made as an arm 74 secured to a rock-shaft 75 rotatably mounted in a bearing 76 provided in a part of the frame structure 77 secured to the upper end of the pump chamber 36. The rock-shaft 75 also carries a second arm 78 extending on an upward inclination for releasing the latch or holding arm.

The piston rod 52 rises above the level of the table and there is mounted upon it an arm 79 which carries a cup-shaped presser or holder and feeder 80 for the fruit being squeezed. The arm 79 springs from a sleeve 81 which fits the piston rod rotatably and is confined by a collar 82 which is secured to the rod and over laps a shoulder 83 on the sleeve. The upper end of this sleeve extends over the collar 82 and has a flange 84 whereon is placed an annular disk or washer 85 and a cap 86. Flange 82, washer 85 and cap 86 are all rigidly secured together, and the washer overlaps at its inner periphery the shoulder 87 on the upper part of the collar. Thus the arm is prevented from being displaced endwise of the piston rod, although it is free to swing horizontally, and is adapted thus to swing from an inoperative position at the rear and one side of the routing tool, shown in Figure 4, to a position over the tool shown in the other figures. A spring 88 secured at one end to the piston rod and at the other end to the cap 86 and coiled about a guide pin 89, which projects from the piston rod, tends to hold the arm 79 in its inoperative position and to return it to that position when released.

A guide rod 90 is secured in an arm 91 which projects from the sleeve 81 and is brought into line with a guide passage 92 when the arm is swung over the routing tool. The guide passage is formed in a part of the framework 77, and it furnishes a bearing or guideway 93 for the piston rod. It also supports a hood or shield 94 which partially encloses the upper part of the piston rod.

The arm 78, previously described in connection with Figures 8 to 11, which may be called the trip arm, rises through a slot 78ᵃ in the framework and projects to a position where it will be struck and slightly moved by the guide rod 90 as the latter comes into line with the passage 92. At this point the trip arm comes to bear on the outer end of slot 78ᵃ and then serves as a stop to arrest arm 79. The movement thus given to the trip arm, as represented in Figure 9 by comparison of the full line and dotted line positions of such arm, displaces the latch arm 74 clear of the coupling pin and leaves the latter free to be projected by its spring 71 into the hole 69 of disk 67 as the latter rotates.

For driving the machine I have provided an electric motor 96 of which the armature shaft drives a shaft 97 carrying a worm 98 or spiral gear which meshes with the worm wheel 19 previously described. A coupling 99 of the Oldham type is interposed between the armature shaft and the shaft 97 to avoid the necessity of maintaining exact alinement between these shafts. Other types and arrangement of driving means may be used, however; as a motor directly mounted on the shaft 16.

Further referring to the routing tool and the fruit holding cup, which I may call for identification in brief the "juice extracting couple," these members, when designed for squeezing the juice from citrus fruit, are given a special formation or structure by which to effect extraction of essential oil from the skins of such fruit in order to enhance the characteristic flavor of the fruit in the drink. Hence, instead of being perfectly spherical and of the same diameter internally as the outside of the fruit, the cup is elongated in the direction of the axis of the machine, being permissibly either spheroidal, or spherical in its upper part and cylindrical in its lower part, with a shorter radius as to each of these parts than the exterior radius of the fruit of the particular size or grade for which the couple is designed. The routing or excavating tool has an approximately similar form, but is enough smaller than the interior of the cup to give clearance for the skin and for those parts of the fruit, such as the membranes dividing the sections of the pulp from one another, which are not extruded with the juice.

These characteristics are shown in Figures 14 to 16 and therein the part 80ª represents the upper substantially spherical zone of the cup and 100 represents the lower substantially cylindrical part. Hence, when the half of an orange smaller in diameter than the cup is pressed between the members of the couple, its skin is pressed upon inwardly in all directions and so deformed that more or less of the cells which contain the essential oil are ruptured and the oil liberated. The liberated oil mixes in part with the juice and so flavors the beverage and a part of it is dissipated into the surrounding air giving an aroma which is an attractive attribute of the machine.

Preferably, also a zone of the generally cylindrical part of the cup at or near the rim thereof, is fluted internally, preferably in substantially the manner shown in Figure 15. The flutes bend the skin locally by indenting those parts of the skin against which they bear and forcing the intermediate parts into the grooves between the flutes; and then as the fluted zone passes on, the portions of the skin previously acted on by them are restored to the previous circular outline by the smooth zone of the cup immediately above the flutes. The action thus applied to the skin is analogous to that of flexing it back and forth sharply and augments the yield of oil.

Although the means last described for giving a bending action to the skin is a desirable adjunct of the cup, it may be omitted and the first described characteristic relied on alone to express the oil. One juice extracting couple having either or both of these characteristics may be designed to handle fruits of a certain range of variations in diameter, and other couples of different specific dimensions will be used for fruits outside of the limits of this range, either in the same machine or in different machines.

In the small scale representation of the fruit pressing cup shown in Figures 1 and 6, I have not attempted to show the characteristics last particularly described, and the couple shown in said figures may be considered as the general representation of an extracting couple adapted for use with any kind of fruit.

In the cup are set spurs 101, the function of which is to penetrate the skin and prevent it from being rotated by or with the routing tool. Preferably these spurs are hook-shaped with their points directed oppositely to the direction of rotation of the routing tool.

An ejector 102, for knocking out the empty skin from the cup after the juice has been extracted, is pivoted at 103 to the wall of the cup at one side thereof and is formed as an arm conforming to the curvature of the cup when in the position shown in Figure 1. This ejector has a lug which is connected by a pivot 104 to a rod 105 which extends along the arm into contact at its other end with the collar 82, being there supported by a guideway 106 formed in the arm, and to this rod is connected a spring 107, attached also to an anchor pin 108 in the arm, which acts to press the rod against this collar. When the arm is swung about the supporting piston rod, this actuator rod 105 travels along the surface of the collar and enters an appropriately placed recess 109 (Figure 5) in that surface when the arm approaches and occupies its operative position with the cup over the routing tool. Then the actuator rod is so placed that it holds the ejector in the withdrawn position shown in Figure 1. But when the arm is swung aside into the inoperative normal position shown in Figures 4, 5 and 6, the end of the actuator rod rides up on the cam surface 110 at the end of the recess and is pushed outward, thereby displacing the ejector toward the rim of the cup as shown in Figure 6 and displacing the empty skin. Preferably the ejector extends across the polar axis of the cup, and is pierced in that axis with an aperture 111 to admit the spike 23 of the routing tool, and the arm 79 is provided with a sheath 112 to envelop and guard the spike when it has passed through this aperture.

In using the machine for the purposes before described, the operator first places the cut fruit on the impaling point of the routing tool, either before or after having set this tool in rotation by starting the driving motor. Then and preferably after the motor has been started, he swings the arm carrying the pressing cup over the tool; and the instant the arm arrives in this position the latch holding back the coupling pin 70 is released and said pin is shot into the hole 69 of the drive disk 67 upon the next traverse of this hole past the location of the pin. Thereby the crank disk 58 is rotated and it depresses the piston rod through the associated cross head 53. This cross head, it may be noted, is guided in a straight line by a block 113 which is mounted on the locking pin 54 and occupies a vertical guideway 114 in the frame 77. The endwise movement thus given the piston rod 52 depresses simultaneously the piston 46 and the arm 79, and with the first part of the downward movement of the latter arm the guide rod 90 enters the passage 92 and thus holds the cup 80 accurately in alinement with the routing tool, making it unnecessary for the operator to continue holding it there. With the continuation of this downward movement the cup passes over the fruit and presses it down against the routing tool, and at the same time the piston displaces liquid from the pump cylinder and compresses the trapped air in the pressure chamber 49, creating an elastic pressure therein.

During the action of expressing the juice from the fruit, the rise on the cam 62 (shown best in Figure 9) causes the valve 48 to open and allows the liquid in the pump system to be forced by the joint action of the pump and of the compressed air pressure in chamber 49 through the hollow driving shaft, and to be expelled through the openings in the routing tool and mixed with the fruit juice at the instant that the latter is squeezed out from the cells of the fruit. The time of this injection of the added liquid is determined by the position of the cam rise, and its amount is determined by the angular length of said cam rise and by the size of the pressure chamber, which controls the intensity of the pressure imposed on the liquid. It may be noted at this point that the chamber must have sufficient volume to receive all the liquid displaced by the pump in excess of that delivered past the control valve and in addition to the body of air entrapped therein, without developing excessive pressure; while at the same time its volume must be small enough to cause such attenuation of the entrapped air in the suction stroke of the pump as will draw from the supply tank a quantity of liquid equal to that expelled by the preceding pressure stroke.

As seen in Figure 9, the cam zone is circular throughout the major part if its circumference and has a short rise located on that side of the cam which is uppermost in the normally stationary position, and the end of the rise is less than 180° of the rotation of the cam from the location of the valve stem. Hence the injection of the added liquid takes place while the juice is flowing from the fruit. This mixing of the fruit juice and the other liquid at the instant of liberation of the juice from the fruit cells is an important factor, because it gives no opportunity for the juice to become oxidized in even the slightest degree before the admixture takes place, and also makes a uniform and homogeneous mixture.

The liquid flows from the lower edge of the skin first through the strainer, upon the rotating table 24 and is thrown by centrifugal force instantly into the encircling conduit and is impelled through the latter by its momentum and air drag induced by the revolving table, to the delivery spout.

Preferably the table and routing tool are rotated at a high rate of speed in order to extract the juice quickly and discharge it instantly after its extraction. Substantially any desired speed may be obtained by proper speed of the motor in the first place, and proper gear ratio between the motor armature shaft and the central shaft 16, but preferably such a speed is given as will cause a more rapid delivery of the juice than could be given by a gravity flow. A high speed of rotation also has the further advantages that it gives a more complete delivery of the liquid from the table and conduit than could be given by slow speed and enables these parts to be more effectively cleaned by water poured on the turn table.

With the completion of a single revolution of the crank disk 58, the cup carrying arm is raised until the guide rod 90 is released, and then the spring 88 acts to swing this arm aside. With the first movement in this manner of the arm the latch trigger 78 is released and the latch arm 74 is allowed to fall into the notch 72 of the coupling pin, whereupon the inclined wall 73 of said notch, acting on a complemental surface or edge of the latch, withdraws the pin and so disconnects the drive of the crank disk. Then this disk comes to rest when a stop pin 115 which projects from the disk strikes the end of the latch. It will be understood, of course, that withdrawal of the guide rod 90 from its guideway occurs long enough previously to the arrival of the coupling pin at the location of the latch to enable the actions last described to take place.

The upstroke of the piston 46 which occurs at this time draws more liquid from the supply tank to make up for the amount previously delivered. It will have been appreciated from the foregoing explanation that the capacity of the pump cylinder and the displacement of the pump piston is greater than the volume of the liquid delivered in any one cycle, whereby it is always assured that an elastic pressure will be developed in the pressure chamber great enough to expel the required quantity of liquid when and while the control valve 48 is opened.

So far as I am aware, the combination involved in the pump, the elastic pressure chamber associated with the pump and the control valve in the eduction conduit from the pressure chamber, and the further combination with the foregoing of a means for so operating the valve as to permit discharge of a measured quantity of the liquid independent of the displacement of the pump, are new combinations in means for delivering measured quantities of liquid, adapted for other uses than in combination or use in or with a machine for the particular purposes hereinbefore described. Such means are therefore not claimed in the present specification except in combination with the fruit juice extracting machine. By means of these combinations any desired quantity of liquid may be delivered during the pressure impulse of the pump, and the energy expended by the pump in displacing the excess liquid is applied to create elastic pressure effective to expel the liquid delivered at the instant when it is needed.

An alternative form of delivery table and conduit equivalent to that previously described is shown in Figures 12 and 13, and there the table is a shallow bowl having an upturned rim 115 forming, with the bottom wall of the bowl, a collection conduit. A delivery tube 116 extends over the rim and is located with one end in the angle between the rim and bottom wall of the bowl, whereby it acts as a scoop to pick up the liquid which is forced into this angle by centrifugal force. The tangential momentum of the liquid causes it to flow upward in the scoop pipe over the rim of the bowl to the delivery spout 34ᵃ, in a manner understood.

Numerous details of structure are shown in the drawings but are not described in detail, because their illustration alone is sufficient to enable those skilled in the art to construct an operative machine embodying this invention.

I do not limit my claim to protection to the entire combination embodied in the machine herein described and illustrated, for certain parts of such combination may be embodied, without other parts thereof, in an operative machine. Thus a machine having the parts which act directly on the fruit and extract and deliver the juice may be constructed and used without provision for addition of another liquid.

What I claim and desire to secure by Letters Patent is:

1. A fruit juice extracting machine comprising a tool adapted to enter and excavate the fruit, means for rotating said tool, means for holding the fruit in contact with the tool, a centrifugal delivering member arranged to receive the juice so extracted from the fruit, and delivering means arranged to conduct the juice from said centrifugal member to a point of discharge.

2. A fruit juice extracting machine comprising a rotatably mounted and driven excavating tool, means for holding a fruit in contact with said tool whereby the juicy pulp thereof is broken up and compressed, a table rotatably mounted beneath said tool to receive the juice so extracted from the fruit, and being driven at such a speed the juice is driven by centrifugal force to its rim, and conducting means arranged to carry away the juice from the rim of said table.

3. A fruit juice extracting machine comprising a rotatable routing tool, a table mounted beneath said routing tool and rotatably driven, an annular conduit surrounding said table and having an inner opening in register with the upper surface of the table, and a delivery spout issuing from said conduit.

4. A fruit juice extracting machine comprising a rotatable routing tool, a table mounted beneath said routing tool and rotatably driven, an annular conduit surrounding said table and having an inner opening in register with the upper surface of the table, a delivery spout issuing from said conduit, and a conduit for cooling liquid extending in heat conducting relation to the first named conduit.

5. A fruit juice extracting machine comprising a tool adapted to excavate the interior of a fruit, a cup adapted to embrace the fruit being excavated, and having means for so deforming the skin of the fruit as to express essential oil therefrom, means for driving said tool rotatably, associated means for causing the approach of the cup toward the tool, and delivering means arranged to conduct away the juice extracted thereby from the fruit.

6. An apparatus for obtaining juice from fruits comprising a tool adapted to enter a section of a fruit and excavate the pulp from the skin, a cup having a spherically curved interior approximately complemental to the tool whereby to embrace the skin of the fruit and hold the same in proximity to the tool, said cup being elongated in the axial direction and its interior radius being less than the exterior radius of the fruit, whereby the cup in being passed over the skin of such a fruit placed on the excavating tool and having a radius greater than that of the cup is caused to deform the fruit and express therefrom essential oils contained in the skin.

7. A fruit juice extracting machine comprising an upright shaft, an excavating tool secured to the upper end of said shaft adapted to enter a section of a fruit and having a piercing point at its extremity adapted to impale and hold such section before the engagement therewith of the after-mentioned cup, a cup adapted to hold the fruit and press it against the excavating tool, a holder for said cup movable to permit placement of the cup over and aside from the tool, driving mechanism for rotating said shaft and tool, and mechanism for advancing the cup holder and cup toward the tool.

8. A fruit juice extracting machine comprising an upright shaft, an excavating tool secured to the upper end of said shaft adapted to enter a section of a fruit, a cup adapted to hold the fruit and press it against the excavating tool, a holder for said cup movable to permit placement of the cup over and aside from the tool, driving mechanism for rotating said shaft and tool, mechanism for advancing the cup holder and cup toward the tool, said mechanism including a disconnectible coupling and a trip device adapted to effect connection of said coupling when the holder is moved to place the cup in line with the tool.

9. An automatic fruit juice extracting machine comprising a routing tool adapted to enter the skin of a divided fruit and disintegrate the pulp thereof, a cup shaped holder approximately complemental to said tool adapted to embrace the fruit and press it toward the tool, a carrier on which said holder is mounted and being movable to bring the carrier into line with and aside from the tool, an ejector arranged in said holder, and means for operating the ejector when the holder is moved aside from the tool so as to expel the skin or shell of the fruit from the holder.

10. In an apparatus for extracting juice from fruit, a cup shaped holder for the fruit, an ejector contained in said holder and adapted to be moved from a position registering with the wall of the holder into the interior space thereof, a pivotally mounted arm carrying the holder, an ejector operating rod movable endwise on said arm, and a stationary cam with respect to which said arm turns and against which said rod rests, the cam being constructed and arranged to move the rod endwise in one direction when the arm is swung in one direction and a spring acting on the rod tending to move it in the opposite direction.

11. In a fruit juice extracting machine a rotatable routing tool adapted to enter the cut fruit, a cup-shaped holder adapted to receive the fruit and press it toward said tool, a swinging arm carrying said holder and by the movement of which the holder is adapted to be placed in line with the tool or aside therefrom, an endwise movable rod on which said arm is mounted, and mechanism for moving said rod endwise in a manner to cause approach of the holder toward the tool.

12. In a fruit juice extracting machine a rotatable routing tool adapted to enter the cut fruit, a cup-shaped holder adapted to receive the fruit and press it toward said tool, a swinging arm carrying said holder and by the movement of which the holder is adapted to be placed in line with the tool or aside therefrom, an endwise movable rod on which said arm is mounted, normally inoperative mechanism arranged and adapted when operated to move the rod and arm so as to carry the rod toward the tool, a driver for said mechanism, a coupling device adapted to make connection between said mechanism and driver, a latch device normally holding said coupling out of its connecting position, and means by which movement of the holder into a position over the tool trips said latch and permits said coupling to become operative.

13. In a fruit juice extracting machine, an excavating tool adapted to break down the juice holding cells of a fruit with endwise feeding movement between the tool and the fruit, a rotatable delivery table beneath said tool, a strainer on said table adapted to receive the juice liberated by the tool, means for rotating said table at a high rate of speed, the strainer being rotatable with the table, whereby the juice is thrown outward over the surface of the table by centrifugal force, a collecting conduit surrounding the table into which the juice is thrown by centrifugal force and along which it is propelled by air drag, and an outlet from said collection conduit.

14. A juice extracting couple adapted to the treatment of citrus fruits comprising a cup and a routing tool, of approximately similar contours, the cup having an elongated generally spherical interior formation with a radius less than that of the fruit which it is designed to act upon, whereby in forcing the members of the couple respectively into and over the outside of the fruit, the skin of the latter is compressed and deformed, and essential oil contained in the skin is liberated.

15. A fruit juice extracting couple adapted to express the juice and essential oil from citrus fruit comprising a routing tool adapted to enter the fruit, and a cup adapted to envelop the skin of the fruit and force it over the routing tool, said cup having an internal diameter less than the outside diameter of the fruit on which it is designed to act, and being fluted in a zone next to its rim whereby to compress and bend the skin of the fruit in being forced thereover.

16. A fruit juice couple adapted to express the juice and essential oil from citrus fruit comprising a routing tool adapted to enter the fruit, and a cup adapted to envelop the skin of the fruit and force it over the routing tool, said cup having an internal diameter less than the outside diameter of the fruit on which it is designed to act, and having a fluted zone adjacent to its rim and an adjoining smooth zone within the rim, whereby in being forced over the skin of the fruit the cup causes flexing of the skin back and forth at points between the flutes, thereby rupturing the oil cells of the skin and expressing the essential oil therefrom.

In testimony whereof I have affixed my signature.

WARREN NOBLE.